Dec. 25, 1962     A. M. HEARLE     3,070,371
MUSICAL GAME
Filed Dec. 17, 1959
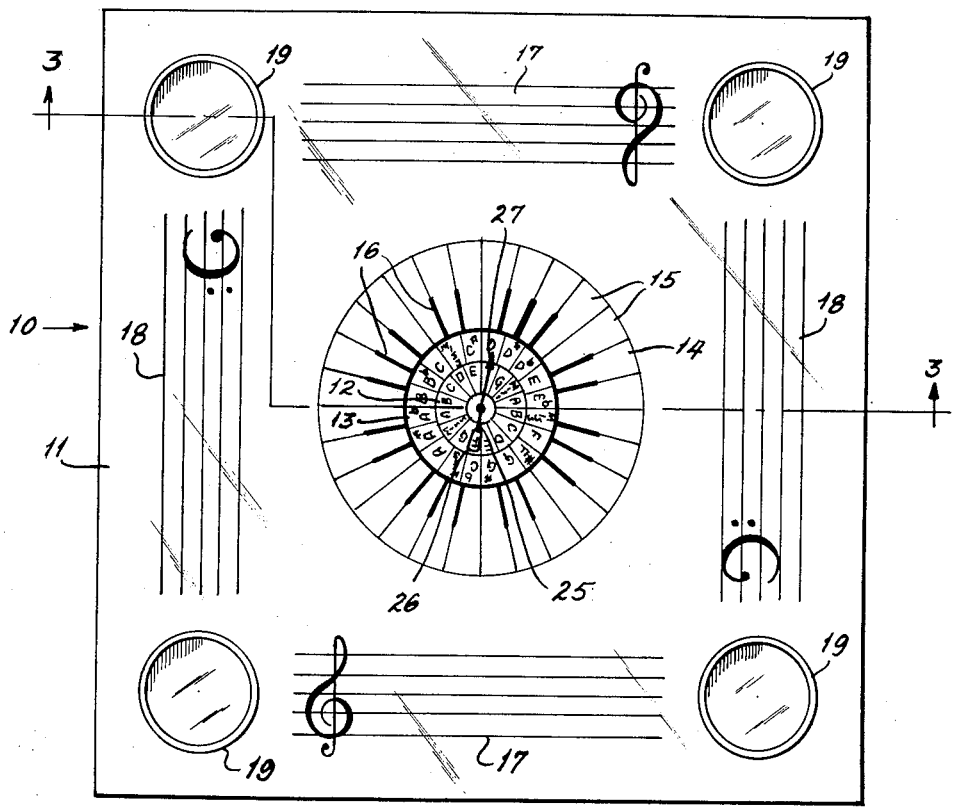
FIG.1
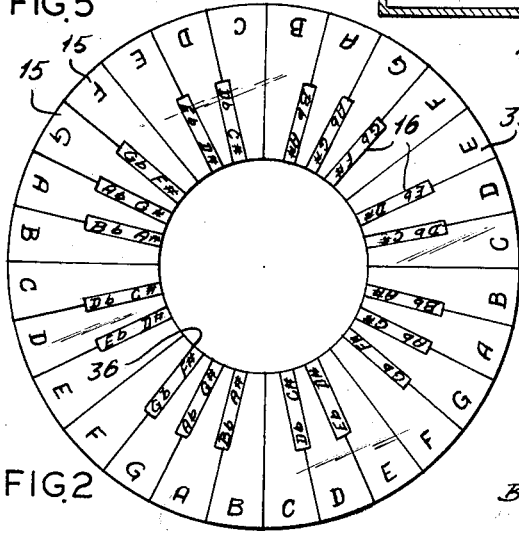
FIG.2
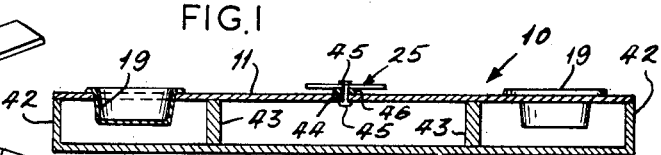
FIG.3
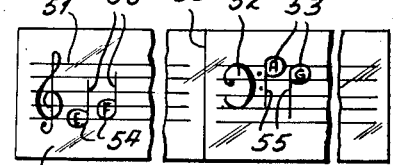
FIG.4
FIG.5
INVENTOR
ALICE M. HEARLE
By Gravely, Lieder & Woodruff
ATTORNEYS,

United States Patent Office 3,070,371
Patented Dec. 25, 1962

3,070,371
MUSICAL GAME
Alice M. Hearle, 1233 Werley Ave., Wellston, Mo.
Filed Dec. 17, 1959, Ser. No. 860,284
3 Claims. (Cl. 273—135)

The present invention relates to games, and in particular to a musical game which can be utilized to teach children the basic elements of music.

An object of this invention is to provide a game which can be played by children and older people having no knowledge of music. Another object is to provide a musical game having a competitive element which can be utilized to teach the basic elements of music to the players. Still another object is to provide a relatively simple game which parents can use to determine if their children have any adaptability for learning music.

Another object is to provide a game having a game board which has musical notes depicted thereon in combination with means for selecting a note at random. A further object is to provide a playing board having musical notes depicted thereon and also having musical staffs wherein notes selected from the board are located at the correct position of the staffs. A further object is to provide a piano keyboard whereby notes selected from those on the staffs can be removed to the keyboard.

A further object is to provide a removable keyboard having the names of the notes such as "A," "B," etc., given thereon to help beginning players learn the correct location of the notes on a piano keyboard.

A further object is to provide a guide folder having thereon the musical staffs and the alphabetical names and locations of the notes on the staffs.

These and other objects and advantages will become apparent hereinafter.

The present invention comprises a game including a playing board having musical notes depicted thereon and means for selecting one of these notes for placement on a musical staff or piano keyboard. The invention further consists in the musical game hereinafter described and claimed and in the method of playing said game.

In the accompanying drawings wherein like numerals refer to like parts;

FIG. 1 is a top plan view of the game board of the present invention,

FIG. 2 is an enlarged top plan view of a guide disk which may be used with the game board shown in FIG. 1, FIG. 3 is a sectional view taken along the line 3—3 in FIG. 1, FIG. 4 is a side elevational view of the guide folder for the musical staffs, and FIG. 5 is an enlarged perspective view of a note representation used in the present game.

Referring now to the drawings in more detail, FIG. 1 shows a game 10 including a playing board 11 provided with concentric rings 12 and 13 of musical notes surrounded by a portion of a piano keyboard 14 including the white keys 15 and the black or sharp and flat keys 16. Treble staffs 17 and bass staffs 18 are provided around the outer periphery of the playing board 11. For each staff, a hollow receptacle 19 is provided in the playing board 11 for holding each player's notes 20, shown in FIG. 5.

A spinner 25 is rotatably fastened to the center of the concentric rings of notes 12 and 13. The spinner 25 has an eye 26 on one end and a pointer 27 on the other end. The eye 26 indicates notes on the inner ring of notes 12, and the pointer 27 indicates notes on the outer ring of notes 13.

A guide disk 35 (FIG. 2), representing a portion of a piano keyboard, is provided with a cut-out center 36 and is constructed and arranged to fit over the blank keyboard 14 on the playing board 11. The guide disk 35 has the alphabetical notation, such as "A," "B" . . . "G," of the piano keys including the sharp and flat notes, printed thereon. This enables a person playing the game for the first few times or a person inexperienced in music to learn the correct location of the notes on the keyboard.

When the guide disk 35 is slipped over the keyboard 14, the concentric rings 12 and 13 are visible in the cut-out center portion 36. Since the spinner 25 indicates notes on the rings 12 and 13, the use of the guide disk 35 does not interfere with the operation of the spinner 25. After one has become proficient in playing the game and knows the relation of the notes to the keys on a piano keyboard, the guide disk 35 can be removed and the game played with the unmarked piano keyboard 14, as shown in FIG. 1.

The structure of the game 10 is shown in more detail in FIG. 3 and includes a body portion 40 having a bottom wall 41 and opposed side walls 42. Reinforcing blocks or spacer members 43 are provided between the bottom wall 41 and the playing board 11. The spinner 25 is retained on the playing board 11 by a rivet 44 which passes through the spinner 25 and the game board 11. The rivet 44 has expanded ends 45 to hold the spinner and game board in assembled relation. A washer 46 is located between the spinner 25 and the game board 11 to facilitate rotation of the spinner 25. The herein described means of attaching the spinner is only illustrative and other means may be provided, if desired.

Other indicator means such as dice, cards, etc. could be used in place of the spinner 25 to select a specific note from the concentric rings 12 and 13.

One or more of the piano keyboard 14, the treble staff 17 and base staff 18 can be separated from the game board 11 without departing from the scope of the present invention. However, it is preferred that the keyboard and the staff arrangement be on the game board 11 (as indicated in FIG. 1) and that a spinner 25 of the type described be used.

FIG. 4 shows a guide folder 50 which has a treble staff 51 and a base staff 52 printed thereon. The staffs 51 and 52 have representations of notes 53 thereon. Each of the printed notes 53 has a head 54 and a stem 55. Inside each note head 54 is the alphabetical name of the respective note of the musical scale, as the shown portion of a treble staff showing the notes "E" and "F."

The guide folder 50 can be folded along the fold line 56 to stand upright before the players to facilitate their learning the name of the musical notes in much the same fashion as the guide disk 35 is used with the piano keyboard 14. The game can be played without the guide folder 50, if desired, or the alphabetical names of the notes can be placed directly on the staffs 17 and 18 on the playing board 11.

In operation, each player is provided with a number of notes 20 (preferably about nine) of a certain color which are placed in the respective note containers 19. The player who starts the game then spins the spinner 25 and the note which is indicated on the note ring 12 by the eye 26 of the spinner 25 is the note selected on the first turn. If desired, the note on the note ring 13 indicated by the pointer 27 of the spinner 25 may be used in starting the game.

The first player then takes a note 20 from his note container 19 and places it on the staff 17 or 18 which happens to be at his place on the game board. For instance, if the player has a treble staff 17, and the eye 26 surrounds the note "F" on the innermost ring 12, he places a note 20 on the first space of the treble staff 17. The game is continued with each player taking his turn until one player has placed all of his notes 20 on his staff or until one player has spelled out the word "FACE" by selecting and indicating the corresponding notes on the staffs 17 and 18. The game then can be stopped with this player the winner, or the game can be continued with the player who has utilized all his notes continuing to take his turn and using the long portion of his spinner 25 which will now indicate a note on the outer ring 13. The player takes the indicated note from his staff and places it on the corresponding key on the piano keyboard 14. The game is continued until one player has moved all of his notes 20 from his staff onto the keyboard 14 or has spelled out the word "FACE" on the keyboard 14. The guide disk 35 may be placed on the game board 11 over the keyboard 14, if desired or needed.

The game also can be played by moving the notes 20 from the note containers 19 directly onto the keyboard 14 as the indicated note is selected by the spinner 25. This mode of playing the game may be preferred if the players have experience and knowledge of reading notes from a staff, but no knowledge of a piano keyboard. If this method of playing the game is used, the guide disk 35 also may be utilized as hereinbefore indicated, if desired. None of the notes on the inner ring 12 is either a sharp or a flat. Therefore, when the game is played in the preferred manner, as hereinbefore explained, and the player selects a sharp or flat note from the outer ring 13, he must move the corresponding note from the staff to the sharp or flat key on the keyboard. For instance, if the indicator spinner 25 selects "D sharp" and the player has the note "D" on his staff 17 or 18, he must move this "D" to the "D sharp" key on the keyboard 14.

Thus it is apparent that the present invention provides a game which is interesting to play and with which children and others can be taught the simple fundamentals of music, particularly how to read music and the relationship between the notes of a staff and the keys of a keyboard.

This invention is intended to cover all changes and modifications of the examples of the invention herein chosen for purposes of the disclosure, which do not constitute departures from the spirit and scope of the invention.

What is claimed is:

1. A game comprising a game board having thereon a circular series of alphabetically indicated names of musical notes and a portion of a piano keyboard concentric with said alphabetical series of musical notes, a circular insert piano keyboard having the alphabetical notation of the keys depicted thereon constructed and arranged to fit over the piano keyboard on the game board, said insert having a cutout center portion to receive the alphabetical series of musical notes, and means for selecting musical notes at random from the alphabetically indicated series for placement on the corresponding keys of the piano keyboard.

2. A game comprising a game board including two concentric rings depicting the alphabetical names of the notes of the musical scale, a third concentric ring depicting a portion of a piano keyboard, a removable insert provided with an annular opening in the center of the same size as the outermost ring of notes, said insert depicting a piano keyboard and having the alphabetical notation of the keys indicated thereon, said insert constructed and arranged to fit over the keyboard on the game board to aid the player in learning the names of the various keys and to be removed after the player has learned the names of the keys, musical staffs, means for selecting notes at random from the concentric rings of notes, and means for indicating the selected notes on the piano keyboard and the musical staffs.

3. A game comprising a game board, a double indicating means pivotally positioned on said board, one of said indicating means describing a circle of greater radius than the circle described by the other of said indicating means, a first ring of individually located and alphabetically indicated notes of the musical scale concentric to the indicating means pivot point, said indicating means of lesser radius constructed and arranged to select musical notes on said first ring, a second ring of individually located and alphabetically indicated notes of the musical scale circumscribed about said first ring, said indicating means of greater radius constructed and arranged to select musical notes on said second ring, a circular piano keyboard circumscribing the second ring of notes, a removable insert member having a piano keyboard thereon including the alphabetical notation of the keys, said insert member constructed and arranged to fit over the piano keyboard on said game board, said insert having a circular shape with a cutout center portion to unobstructedly receive the indicating means, a plurality of musical staffs positioned adjacent to the margin of the game board, and a receptacle for indicating means associated with each staff.

References Cited in the file of this patent
UNITED STATES PATENTS

| | | |
|---|---|---|
| 848,282 | Berg | Mar. 26, 1907 |
| 1,406,960 | Allen | Feb. 21, 1922 |
| 1,558,083 | Gittens | Oct. 20, 1925 |
| 2,339,351 | Myers | Jan. 18, 1944 |
| 2,447,213 | Sledge | Aug. 17, 1948 |
| 2,451,196 | Bruck | Oct. 12, 1948 |
| 2,577,961 | Graves | Dec. 11, 1951 |
| 2,801,856 | Medowar | Aug. 6, 1957 |